Sept. 9, 1930.    R. G. BEVIS    1,775,361
SAW CONSTRUCTION
Filed Sept. 25, 1929
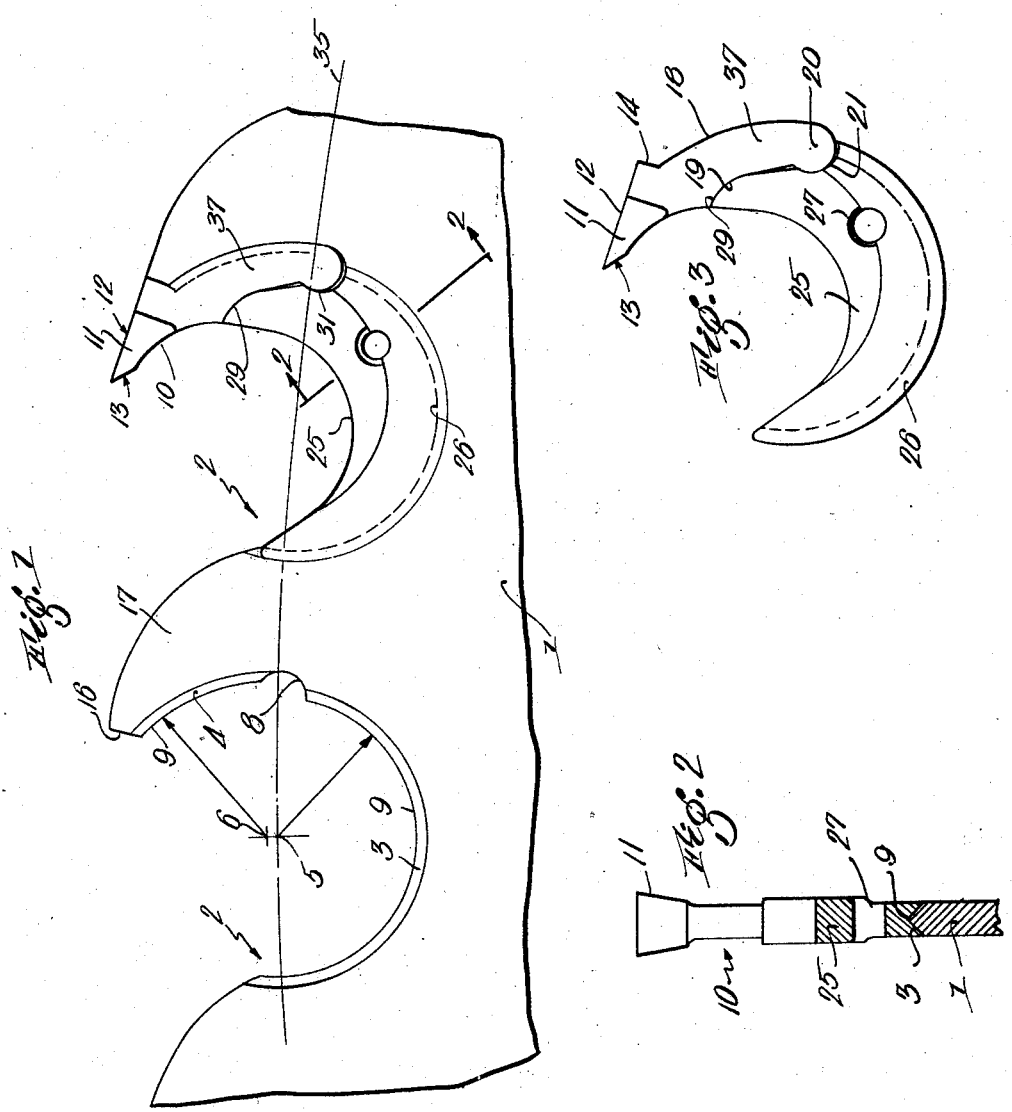

Patented Sept. 9, 1930

1,775,361

UNITED STATES PATENT OFFICE

ROY G. BEVIS, OF PORTLAND, OREGON, ASSIGNOR TO SIMONDS SAW AND STEEL COMPANY, OF FITCHBURG, MASSACHUSETTS, A CORPORATION OF MASSACHUSETTS

SAW CONSTRUCTION

Application filed September 25, 1929. Serial No. 395,074.

This invention relates to an improvement in saws, and more particularly to saws having inserted teeth. The present invention provides an arrangement of inserted teeth and retaining elements which cooperate with gullets arranged to permit the firm anchoring and supporting of the teeth in place, while permitting the maximum number of teeth to be carried by a saw of given circumferential extent, while affording adequate room for the sawdust.

More particularly the present invention affords an improved arrangement of the retaining element and the saw tooth which permits a compact installation of this character which permits the saw teeth to be disposed close to each other, while allowing sufficient metal between the gullets properly to support the teeth and affording a design of tooth which is adapted to cooperate with a suitable retainer in ensuring the firm anchoring of the teeth in place. To this end the present invention affords a gullet having curved portions of different diameters and with different centers, one of said portions providing a curved bearing for a curved neck portion of an inserted tooth. Each of these gullets is also preferably provided with a straight bearing surface adapted to engage a portion of the tooth opposite its point. The tooth itself preferably is provided with a curved neck terminating at its base in a curved lug that is adapted to engage and bear against a recess in the crescent-like retainer that is disposed in the base of the gullet. The end of the retainer provides a curved pivot surface that is adapted to force the opposite curved side of the neck of the tooth into firm engagement with the adjoining curved bearing surface. Preferably the opposite sides of the neck extend toward each other, thus affording a wedge-like effect so that the pivot surface is effective as the tooth and retainer are forced into position, ensuring the firm retention of the tooth in place. In order to permit this desirable result without necessitating extreme accuracy in workmanship, which is particularly difficult to attain with hardened articles such as saw teeth, a suitable clearance space is normally provided between the pivot surface of the retainer and the part thereof which engages the lug. Thus the retainer operates firmly to hold the tooth in place despite slight inaccuracies in the same which ordinarily accompany the manufacture of articles of this character.

In the accompanying drawings:

Fig. 1 is a perspective view of a circumferential portion of a saw, showing one of the teeth and retainers in place and showing the adjoining gullet without the corresponding tooth and retainer;

Fig. 2 is a section on line 2—2 of Fig. 1; and

Fig. 3 is an elevational view of the tooth and retainer.

Referring to the accompanying drawings, which illustrate a concrete embodiment of the invention, the numeral 1 designates a saw plate which preferably may be in the form of a disk. This disk may be provided with a plurality of similar gullets 2 separated by integral lugs 17, each of these gullets being defined by arcuate surfaces 3 and 4, the inner surface 3 of each gullet having a center designated by the numeral 5 and the outer arcuate bearing surface 4 having a somewhat greater radius and having its center 6 disposed slightly outward of the center of surface 3. Preferably these surfaces may be connected with each other by a suitable curved edge portion 8. Each of the surfaces 3 and 4 preferably may be provided with a V-shaped ridge 9 to interfit with a complementarily formed recess upon the retainer or upon the neck of the tooth.

Each tooth 10 comprises a point 11 which is defined by a pair of surfaces 12 and 13 which are inclined at an acute angle to each other. The outer surface 12 preferably intersects a planar surface 14 that is adapted to engage a similar bearing surface 16 upon the outer end of a lug 17 of the saw disk.

The point of the tooth preferably is connected to a curved neck portion 37 that is provided with a curved surface 18 having a V-shaped groove adapted to engage the ridge 9 of the bearing surface 4. The opposite side of the neck is also curved, as designated by numeral 19, the sides 18 and 19 extending somewhat toward each other in the direction of the base of the tooth. The neck 37 preferably terminates in a suitable lug 20 which has a convexly curved surface 21 which may resemble a portion of the surface of a cylinder and which projects inwardly from the neck in the direction of the tooth point 11, i. e. from the side 19.

The retainer 25 is substantially crescent-shaped and is provided with an arcuate groove 26 that is adapted to engage the ridged surface 3 of the gullet as the retainer is pressed into position. The retainer is provided with the usual opening 27 to receive a suitable tool to effect its inserting or removal. The outer end of the retainer is curved to provide a pivot surface 29 that is adapted to engage the outer end of the curved surface 19 of the neck of the tooth, these parts being so disposed that normally the pivot surface 29 will bear against the neck of the tooth substantially opposite the intermediate part of the surface 18, thus being effective in firmly wedging the latter into engagement with the surface 4 of the gullet. The retainer is provided with a suitable curved recess 31, the wall of which is curved substantially to form a continuation of the surface 8 of the gullet, and preferably the surface of the retainer between the pivot surface 29 and the recess 31 inclines away from the neck of the tooth to provide a slight clearance above the lug 20.

Preferably the center of lug 20 is disposed slightly inwardly of the circumferential line 35 which passes through the centers 5 of the curved surfaces 3 of the gullets. The straight bearing surface 14 preferably lies in a plane that extends substantially midway between the centers 5 of the gullet and the center of the lug 20 of the corresponding tooth.

When a tooth of this character is inserted, the retainer 25 is brought into engagement with the ridge 9 of the surface 3 and turned downwardly in the same, the recess 31 engaging the upper part of the lug 20 and thus being effective in drawing the surface 18 in a curved path in engagement with the ridge 9 of bearing surface 4. Due to the position of the curved surface 18 and the pivot point 29, the neck of the tooth is firmly wedged between the outer end of the retainer and the bearing surface so that these parts are firmly engaged with each other. Since it is only necessary for the pivot surface 29 and a portion of the recess 31 to engage the tooth, extreme accuracy in workmanship is not necessary to ensure the firm retention of the tooth in place.

The provision of the arcuate surfaces 3 and 4 with different radii permits the compact arrangement of the teeth, while still allowing sufficient metal at the base of each lug 17 to receive the imposed stresses. Furthermore, the arrangement of these arcuate surfaces with different centers enhances the wedge-like engagement of the neck of the tooth with the retainer.

I claim:

1. A saw comprising a plate, a plurality of gullets along the edge thereof, each gullet having a curved bearing portion and a straight bearing portion, said curved bearing portion including two arcuate sections of different radii, the inner section having a smaller radius of curvature and having its center disposed inwardly of the center of the outer section, a crescent-like retainer in interfitting engagement with said inner section, a tooth having a curved edge bearing on said outer bearing section and a straight edge bearing on the straight bearing portion, said curved edge of the tooth defining one side of a curved neck, a lug engaging a recess in the retainer and being connected by the curved neck to the point of the tooth, said retainer having a curved pivot surface engaging the curved edge of the neck opposite the intermediate part of its first-named edge, said curved edges of the neck extending toward each other, whereby the neck is narrower adjoining the lug, said retainer and neck being arranged normally to provide a clearance space between their mutually engaging portions in the region of the pivot surface and lug respectively.

2. A saw comprising a plate, a plurality of gullets along the edge thereof, each gullet having a curved bearing portion and a straight bearing portion, said curved bearing portion including two arcuate sections of different radii, the inner section having a smaller radius of curvature and having its center disposed inwardly of the center of the outer section, a crescent-like retainer in interfitting engagement with said inner section, a tooth having a curved edge bearing on said outer bearing section and a straight edge bearing on the straight bearing portion, said curved edge of the tooth defining one side of a curved neck, a lug engaging a recess in the retainer and being connected by the curved neck to the point of the tooth, said retainer having a curved pivot surface engaging the curved edge of the neck opposite the intermediate part of its first-named edge, said curved edges of the neck extending toward each other, whereby the neck is narrower adjoining the lug, said pivot surface merging into a surface that extends away from the adjoining curved edge of the neck to provide a clearance space between the regions of the pivot surface and lug respectively.

3. A saw comprising a plate, a plurality of gullets along the edge thereof, each gullet having a curved bearing portion and a straight portion, said curved bearing portion including two sections of different radii, the inner section having a smaller radius of curvature and a center disposed inwardly of the center of the outer curved portion, a crescent-like retainer in interfitting engagement with said inner section, and a tooth with an edge in interfitting engagement with the outer section, the tooth having a pointed end overhanging the retainer, the straight bearing edge of the gullet being disposed in engagement with the tooth, the inner end of said tooth having a curved lug formed thereon, a neck with curved edges connecting the point of the tooth and the lug, said curved edges engaging the outer bearing section and the outer end of the retainer respectively, a recess in the retainer with a curved edge engaging the lug, the curved edges of the neck extending toward each other, whereby the neck is narrower adjoining the lug, said curved edge of the recess in the retainer merging into a substantially straight surface that is disposed in spaced relation to the neck of the tooth adjoining the lug, said straight bearing edge being disposed in a plane substantially one-half way between the center of curvature of inner gullet section and the center of the curved recess.

4. A saw comprising a plate, a plurality of gullets along the edge thereof, each gullet having a curved bearing portion and a straight bearing portion, said curved bearing portion including two arcuate sections of different radii, the inner section having a smaller radius of curvature and having its center disposed inwardly of the center of the outer section, a crescent-like retainer in interfitting engagement with said inner section, a tooth having a curved edge portion of V-shaped cross section engaging said outer bearing section and a straight edge bearing on the straight bearing portion, said curved edge of the tooth defining one side of a curved neck, a lug engaging a recess in the retainer and being connected by the curved neck to the point of the tooth, said retainer having a curved pivot surface engaging the curved edge of the neck opposite the intermediate part of its first-named edge, said curved edges of the neck extending toward each other, whereby the neck is narrower adjoining the lug, said retainer and neck being arranged normally to provide a clearance space between their mutually engaging portions in the region of the pivot surface and lug respectively.

5. A saw tooth comprising a point defined by inner and outer cutting surfaces at an acute angle with each other, a straight bearing surface opposite said point and extending substantially at right angles to the outer cutting surface, a generally curved neck extending away from the point and the straight bearing surface, the edge of the neck adjoining the straight bearing surface being provided with a V-shaped groove to interfit with a portion of the saw blade and having a substantially constant curvature, and an enlargement of said neck forming a lug at the base of the tooth to engage a complementary shaped recess in a retainer, the surface of the edge of the neck opposite the V-shaped groove being provided with an outer portion having a smaller radius of curvature than the opposite edge and gradually merging into a substantially straight surface extending to the lug, the substantially straight surface inclining toward the outer curved edge of the neck, whereby the neck is narrower adjoining the lug than adjoining the point, and whereby the portion of the neck having the small radius of curvature is adapted to engage the outer end of a retainer while the lug may be engaged with a recess in the retainer and the substantially straight surface of the neck may be spaced from the retainer.

6. A saw tooth comprising a point defined by inner and outer cutting surfaces at an acute angle with each other, a straight bearing surface opposite said point and extending substantially at right angles to the outer cutting surface, a generally curved neck extending away from the point and the straight bearing surface, the edge of the neck adjoining the straight bearing surface being provided with a V-shaped groove to interfit with a portion of the saw blade, and having a substantially constant curvature, and an enlargement of said neck forming a lug at the base of the tooth to engage a complementary shaped recess in a retainer, the surface of the edge of the neck opposite the V-shaped groove being provided with an outer portion having a smaller radius of curvature than the opposite end, and gradually merging into a substantially straight surface extending to the lug, the substantially straight surface inclining toward the outer curved edge of the neck, whereby the neck is narrower adjoining the lug than adjoining the point, the portion of the neck having the small radius of curvature being adapted to engage the outer end of a retainer, while the lug engages with a recess in the retainer and the substantially straight surface of the neck is spaced from the retainer, said lug projecting beyond the inner substantially straight edge of the neck and having a convexly curved surface between the opposite edges of the neck.

Signed by me at Portland, Oregon this eleventh day of September, 1929.

ROY G. BEVIS.